United States Patent [19]

Kikuchi et al.

[11] Patent Number: 5,022,022

[45] Date of Patent: Jun. 4, 1991

[54] SUPPORT STRUCTURE FOR AN OPTICAL PICKUP ELECTRICALLY ADJUSTABLE IN TWO DIRECTIONS

[75] Inventors: Ikuya Kikuchi; Ryo Sato, both of Saitama, Japan

[73] Assignee: Pioneer Electronic Corporation, Tokyo, Japan

[21] Appl. No.: 279,635

[22] Filed: Dec. 5, 1988

[30] Foreign Application Priority Data

Dec. 15, 1987 [JP] Japan ................. 62-190268

[51] Int. Cl.$^5$ ................................. G11B 7/00
[52] U.S. Cl. ................................. 369/44.16
[58] Field of Search ............... 369/44.14, 44.15, 44.16; 350/245, 247, 252, 255, 484

[56] References Cited

U.S. PATENT DOCUMENTS 4,555,780  11/1985  Koide ..................... 369/44.16
4,794,580  12/1988  Ikedo et al. ............. 369/44.16

FOREIGN PATENT DOCUMENTS 64-47829  2/1987  Japan ...................... 369/44.16

Primary Examiner—Donald McElheny, Jr.
Attorney, Agent, or Firm—Sughrue, Mion, Zinn, Macpeak & Seas

[57]  ABSTRACT

An optical pickup for an optical recording disk in which a holder supports at least some of the optical member and has fixed thereto electrical coils for driving the holder perpendicularly to the disk and parallel to the disk. The holder is supported by four cantilevered supports having fixed ends fixed to a magnetic yoke forming part of the magnetic circuits in conjunction with the electrical coils. Preferably, the cantilevered supports are insulated from the yoke so as to provide power supply paths for the coils.

6 Claims, 2 Drawing Sheets

SUPPORT STRUCTURE FOR AN OPTICAL PICKUP ELECTRICALLY ADJUSTABLE IN TWO DIRECTIONS

BACKGROUND OF THE INVENTION

1. Field of the Invention

The present invention relates generally to an optical pickup. In particular, it relates to a support structure for the optical pickup allowing two-dimensioned adjustment.

2. Description of the Prior Art

An optical pickup is arranged in a manner so that laser light emitted for reading information is converged into a spotlight beam incident on a recording track formed on an information recording surface of a recording medium, such as a disk. The optical pickup then detects changes of intensity of light reflected from the information recording surface of the disk to thereby read out the information recorded on the disk. To this end, it is necessary to reliably converge the incident laser light on the recording track even in the presence of planar undulations of the recording surface due to surface warping of the recording disk. The optical pickup is therefore arranged so that a focusing servo operation is performed so as to finely move an objective lens converging the laser light in a direction perpendicular to the recording surface to thereby achieve adjustment in the focus. Further, it is necessary to make the converged laser light always correctly trace the recording track even when the recording track is eccentric. The optical pickup is therefore arranged so that a tracking servo operation is performed so as to finely move the objective lens converging the laser light perpendicularly to the recording track in the plane of the recording surface.

Such an optical pickup as described above is well known and is disclosed in Japanese Utility Model Unexamined Publication No. 62-1332191. The optical pickup disclosed in this publication is shown in FIGS. 1(A) and 1(B). An objective lens 1 for irradiating a recording surface of a recording medium (not shown) with a spotlight beam is fixed to one open-end side of a cylindrical holder 2. The holder 2 is open at both its opposite ends. A focusing coil 3 is wound on the outer circumferential surface of the cylindrical holder 2, and tracking coils 5a and 5b are fixed on the focusing coil 3. The focusing coil 3 is oriented so that the central axis of the focusing coil 3 is parallel with the optical axis of the objective lens 1. On the other hand, the tracking coils 5a and 5b are fixed on an outer circumferential surface of the focusing coil 3 so that each of the central axes of the tracking coils 5a and 5b is perpendicular to the optical axis of the objective lens 1.

The holder 2 on which the focusing coil 3, the tracking coils 5a and 5b, and the objective lens 1 are fixed is supported on the free ends of four flexible cantilever supports 6 extending in the direction perpendicular to the optical axis of the objective lens 1. This optical axis extends along the direction of an arrow F in the drawing. The fixed ends of the cantilever supports 6, on the contrary, are supported on a mount 7. The mount 7 is fixed by a screw 11 to an outside yoke 10a integrally formed with a base 8 of the optical pickup. The fixed ends of the plate-like cantilever supports 6 are fit into slits 7a formed in a side of the mount 7 and fixed thereto with an adhesive. Since the four cantilever supports 6 are flexible, the holder 2 is movable relative to the base 8 in the direction of the optical axis of the objective lens 1, that is, in the direction of the arrow F. The holder 6 is also movable relative to the base 8 in the direction perpendicular to the optical axis of the objective lens 1 in parallel to the surface of the recording disk, that is, in the direction of an arrow T in the drawing. The base 8 is fixed to a carriage which moves radially with respect to the recording disk.

In addition to the outside yokes 10a and 10b, inside yokes 12a and 12b are integrally formed with the base 8 in positions between the holder 2 and the outside yokes 10a and 10b. Magnets 13a and 13b are attached on the respective surfaces of the outside yokes 10a and 10b facing the inside yokes 12a and 12b with predetermined gaps 15 between the magnets 13a, 13b and the inside yokes 12a, 12b. The base 8, the outside yokes 10a and 10b, and the inside yokes 12a and 12b are composed of a magnetic material. Two magnetic circuits are constituted by the base 8, the outside yokes 10a and 10b the inside yokes 12a and 12b, and the magnets 13a and 13b, with the above-mentioned gaps 15 acting as magnetic gap 15.

The focusing coil 3 and the tracking coils 5a and 5b are partly located within the magnetic gaps 15 so that those coils can be interlinked with magnetic flux produced in the magnetic produced in the magnetic gap 15. As a result, the objective lens 1, which is an optical element, can be driven longitudinally together with the holder 2 in the direction of the arrow F by making a current flow in the focusing coil 3. As a further result, the objective lens 1 can be driven transversely together with the holder 2 in the direction of the arrow T by making a current flow in the tracking coils 5a and 5b.

In the foregoing conventional pickup, however, there has been a disadvantage in that it is necessary to provide the mount 7 solely for the purpose of supporting the fixed ends of the cantilever supports members. Also, the screw 11 is required for fixing the mount 7 to the outside yoke 10a. As a result, the pickup is large in size, heavy in weight and high in cost.

SUMMARY OF THE INVENTION

It is therefore an object of the present invention to eliminate the foregoing disadvantage in the prior art.

Therefore, it is an object of the present invention to provide an optical pickup which is small in size, light in weight and low in cost.

In order to attain the foregoing objects, the optical pickup according to the present invention is arranged such that fixed ends of flexible supports supporting at their free ends optical parts such as an objective lens and the like are supported by a yoke constituting a magnetic circuit for driving the optical parts.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENT

Referring to FIGS. 2(A) and 2(B) and FIGS. 3(A) and 3(B), an embodiment of the optical pickup according to the present invention will now be described.

Figure 1A:
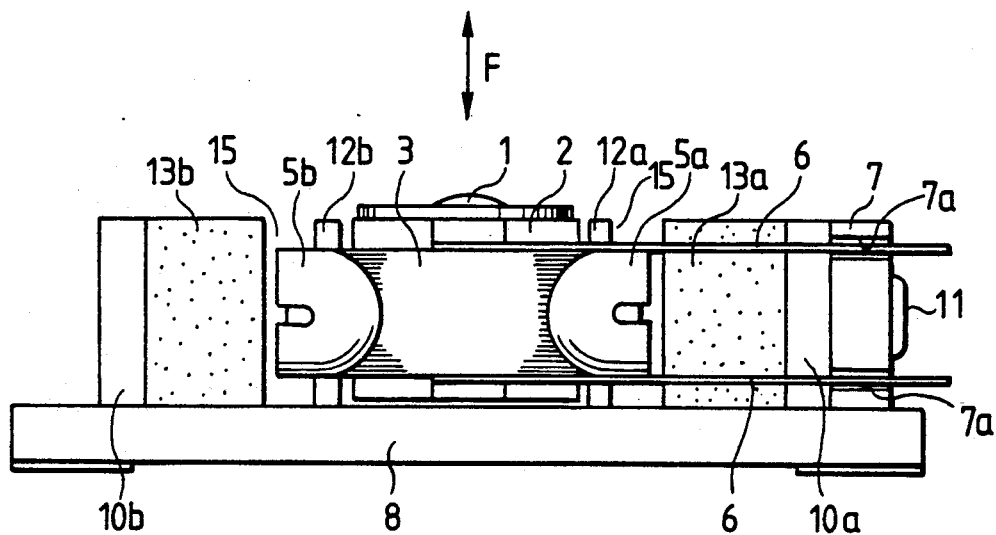
FIGS. 1(A) and 1(B) are a sectional view and a side view respectively, showing a conventional optical pickup.
Figure 2A:
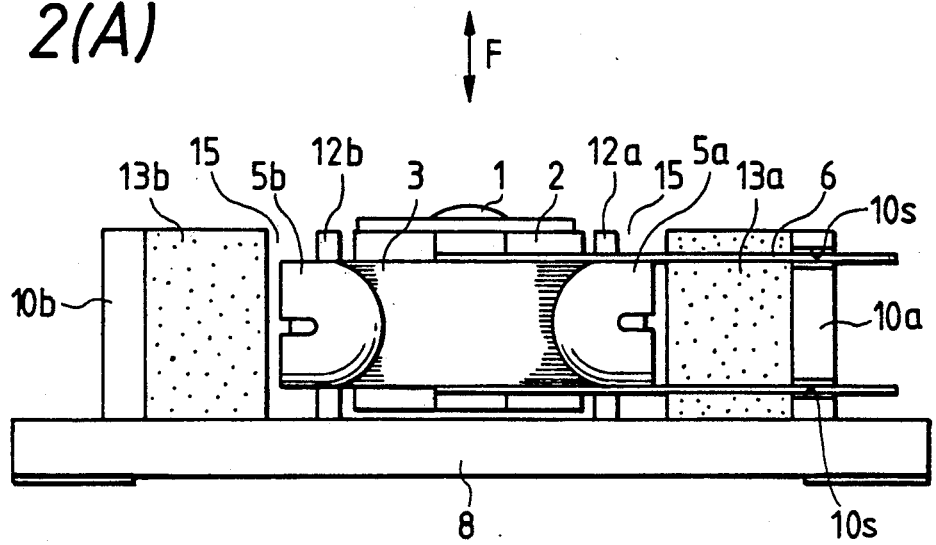
FIGS. 2(A) and 2(B) are a sectional view and side view showing an embodiment of the optical pickup according to the present invention.
Figure 2B:
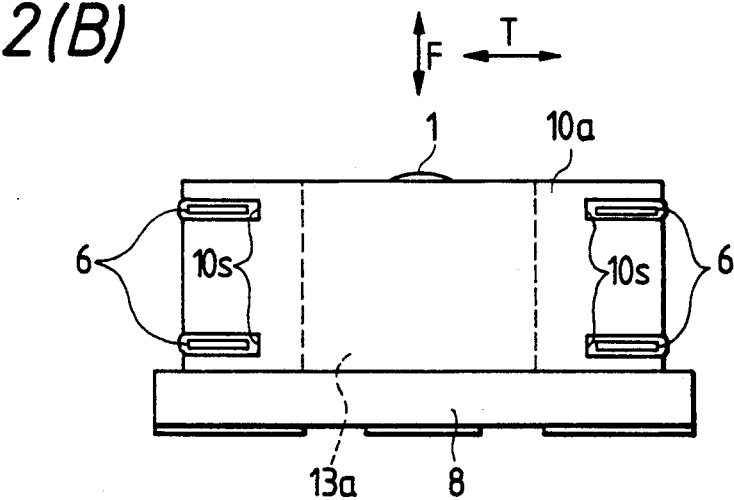

As shown in FIGS. 2(A) and 2(B), in the optical pickup according to the present invention, an objective lens 1 is fixed to a holder 2 which is supported at free ends of flexible cantilever supports 6. The cantilever supports 6 are supported at their fixed ends by an outside yoke 10a constituting part of a magnetic circuit. There is no mount 7, as in FIG. 1(A).

As will be apparent from FIG. 2(B). the outside yoke 10a extends laterally in the directions of an arrow T beyond the sides of a magnet 13a. The fixed ends of the respective cantilever supports 6 are inserted into slits 10s formed at opposite sides of the outside yoke 10a. The cantilever supports 6 and the slits 10s rightwardly and leftwardly in FIG. 2(B) from the opposite sides of the magnet 13a so that the cantilever supports 6 are free of the magnet 13a and are supported by the outside yoke 10a.

Figure 3A:
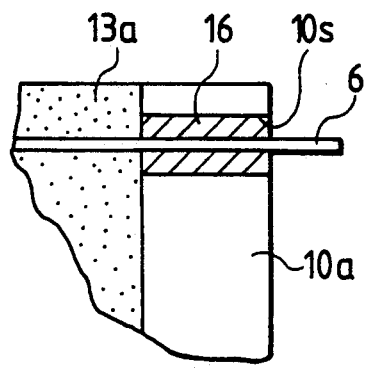
FIGS. 3(A) and 3(B) are enlarged sectional views showing part of FIGS. 2(A) and 2(B), respectively.
Figure 3B:
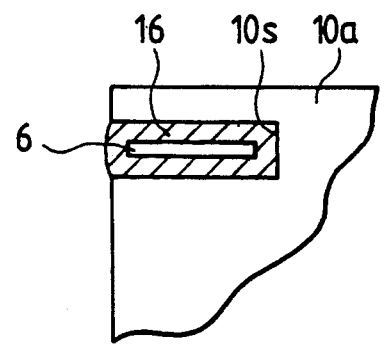

If the respective fixed ends of the cantilever supports 6 are fixed to the slits 10s while the fixed ends are insulated from the outside yoke 10a by using insulators 16 as shown in FIGS. 3(A) and 3(B). the cantilever supports 6 may be used as electric power feeders for feeding power from a power source 17 to a focusing coil 3 or to tracking coils 5a and 5b.

Only the objective lens 1 is shown in the illustrated embodiment as optical parts held by the holder 2 and supported by the cantilever supports 6 through the holder 2. However, the optical parts may include, for example, a light emission element, a light reception element, a diffraction grid, a cylindrical lens, a beam splitter, and so on, in a manner so that one or more or all of the foregoing parts are held on the lens holder 2 together with the objective lens 1 so as to be supported by the cantilever supports 6 so that those optical parts are servo driven to perform focusing and tracking.

Figure 1B:
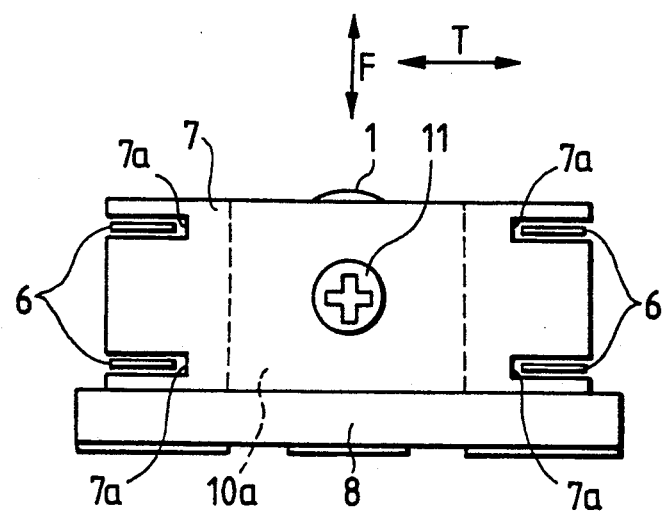

The optical pickup according to the present invention has the same arrangement as that of the foregoing conventional optical pickup shown in FIGS. 1(A) and 1(B) except for the arrangement described above. Therefore, portions the same as or corresponding to the portions in the foregoing conventional case are correspondingly references, and explanation thereof is omitted.

As described above, the optical pickup according to the present invention is arranged such that fixed ends of flexible supporting members supporting at their free ends optical parts such as an objective lens and the like are supported by a yoke constituting a part of a magnetic circuit for driving the optical parts. Thus, the mount provided only for supporting the fixed portions of the supporting members and the screw provided for fixing the mount to the outside yoke in the conventional optical pickup become unnecessary. Therefore, the optical pickup according to the present invention is reduced in number of necessary parts, in size, in weight, as well as in cost.

What is claimed is:

1. A optical pickup, comprising:
    optical means for irradiating a recording surface of an optical recording medium with a spotlight beam to thereby read information from said recording surface;
    supporting means for movably supporting said optical means so that said optical means is controllably movable in a first direction perpendicular to said recording surface and in a second direction perpendicular to said first direction;
    driving means including magnetic circuits having magnetic gas and electrical coils partly located within said magnetic gaps for driving said optical means in said first and second directions;
    said supporting means including a magnetic yoke with slits formed in said yoke said yoke forming part of at least one of said magnetic circuits,
    electrical insulators fitted within at least one of said slits, and
    said supporting means further including flexible supporting members, each of said flexible supporting members having a first end supported by said yoke and a second end supporting said optical means, wherein said first ends are fitted within said slits, with at least one of said first ends being surrounded by said electrical insulators.

2. An optical pickup according to claim 1, further comprising insulating means for insulating said yoke from each of said flexible supporting members.

3. An optical pickup as recited in claim 1, further comprising electrical power supply means connected to at least one of said supporting members surrounded by one of said insulators.

4. An optical pickup as recited in claim 1, wherein said supporting means includes a holder member holding said optical means and supported by said another ends of said supporting members, said electrical coils being fixed to said holder member.

5. An optical pickup as recited in claim 4, further comprising a magnet forming part of at least one of said magnetic circuits and disposed between said holder and said yoke without touching any of said supporting members.

6. A optical pickup, comprising:
    optical means for irradiating a recording surface of an optical recording medium with a spotlight beam to thereby read information from said recording surface;
    supporting means for movably supporting said optical means so that said optical means is controllably movable in a first direction perpendicular to said recording surface and in a second direction perpendicular to said first direction; and
    driving means including magnetic circuit shaving magnetic gas and electrical coils partly located within said magnetic gaps for driving said optical means in said first and second directions;
    wherein said supporting means includes a magnetic yoke and flexible supporting members, said yoke forming part of at least one of said magnetic circuits, each of said flexible supporting members having one end supported by said yoke and another end supporting said optical means; and
    at least one of said flexible supporting members connecting to an electric power supply for supplying power to at least one of said electric coils independently of any current flow within said yoke supporting said at least one of said flexible supporting members.

* * * * *